O. B. FALES.
STEERING WHEEL FOR AUTOMOBILES.
APPLICATION FILED APR. 13, 1918.

1,309,123.

Patented July 8, 1919.
2 SHEETS—SHEET 1.

INVENTOR
Orange B. Fales,
By J. W. Bond
ATTORNEY

O. B. FALES.
STEERING WHEEL FOR AUTOMOBILES.
APPLICATION FILED APR. 13, 1918.

1,309,123.

Patented July 8, 1919.
2 SHEETS—SHEET 2.

INVENTOR
Orange B. Fales,
By J. W. Bond
ATTORNEY.

UNITED STATES PATENT OFFICE.

ORANGE B. FALES, OF SALEM, OHIO.

STEERING-WHEEL FOR AUTOMOBILES.

1,309,123.　　　　　Specification of Letters Patent.　　　Patented July 8, 1919.

Application filed April 13, 1918. Serial No. 228,460.

*To all whom it may concern:*

Be it known that I, ORANGE B. FALES, a citizen of the United States, residing at Salem, in the county of Columbiana and State of Ohio, have invented a new and useful Steering-Wheel for Automobiles, of which the following is a specification.

This invention relates to steering wheels for automobiles and the like and more particularly to pivoted wheels of this class, the object being to construct a wheel that can be swung out of operative position in order to give more room for the driver or other occupants of the vehicle in getting in and out of said vehicle.

Another object is to construct a wheel of this class with a locking means to secure it when in operative position and to let the wheel free to turn independently of the steering column when the occupants desire to leave the car.

With these objects in view the invention consists in the novel construction and arrangement of parts, hereinafter described, illustrated in the accompanying drawings, and particularly pointed out in the appended claims, it being understood that various changes in the form, proportions, size and minor details of construction may be made within the scope of the appended claims, without departing from the spirit or sacrificing any of the advantages of the invention.

In the drawings.

Similar numerals of reference indicate corresponding parts throughout the several figures of the drawings.

Figure 2:
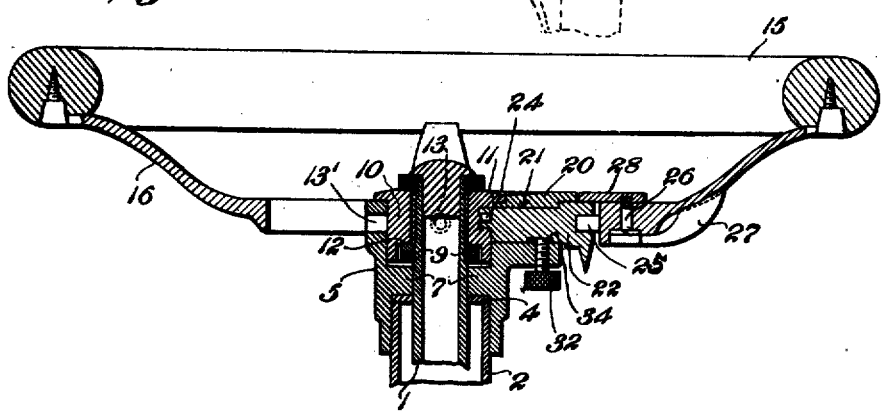
Fig. 2 is a cross section through my wheel showing the catch for locking the wheel in operative position and also the latch bar for coupling the wheel and steering column together.
Figure 3:
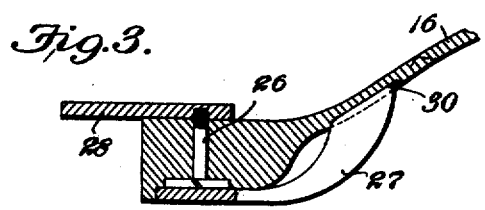
Fig. 3 is an enlarged section through the catch.

The ordinary steering post shown at 1 with a hollow housing 2 are of the usual construction employed on automobiles. Upon the upper end of the housing 2 is placed a washer 4 which is of the exact diameter of the housing and fits snugly about the steering post 1. A hub portion 5 is then placed upon the upper end of the steering post and an annular flange extending downwardly from the hub fits about the upper end of the housing, as shown in Fig. 2. Different makes of automobiles, will of course have housings about the steering column, of different diameters and in order to adapt my wheel to any make of car I use an auxiliary bushing shown at 6 in Fig. 5 when the steering column housing is of less diameter than the flange of the hub. These auxiliary bushings will all be of the same exterior diameter but the thickness in the metal will produce different interior diameters. I am thus enabled, if for instance the flange of the hub 5 has an interior diameter of one and one-half inches to fit the hub upon a housing an inch and a quarter outside diameter by using an auxiliary bushing an eighth of an inch thick.

Figure 5:
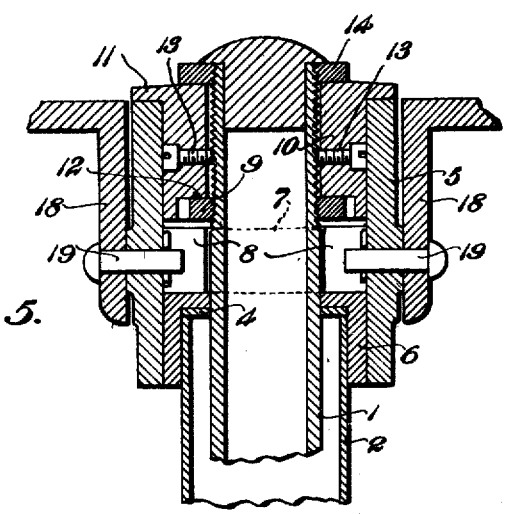
Fig. 5 is an enlarged section through the hub taken on the line 5—5, of Fig. 4.

Extending inwardly about midway between the ends of the hub 5 is an annular flange portion 7 in which is formed oppositely disposed slots 8. This flange portion 7 is designed to rest upon the washer 4, or when the auxiliary bushing is used as shown in Fig. 5, to rest upon the upper side of the said auxiliary bushing. The upper end of the steering post is threaded and upon this threaded portion is screwed a nut 9 and inserted through the open upper end of the hub and about the steering post is an annular member 10 which has an outwardly extending flange 11 designed to rest upon the upper face of the hub. A concentric depression of approximately the depth of the thickness of the nut 9 is formed in the lower portion of the member 10, the face 12 of the depression being designed to bear upon the nut. A jam nut 14 is then screwed upon the extremity of the post 1 and binds the portion 10 against the nut 9 so that the steering post and portion 10 turn together, the hub 5 being free to rotate independently of the steering post and member 10.

To further lock the portion 10 to the steering post, screws 13 with counter sunk heads are threaded through the portion 10 and bind against the steering post. An aperture 13' is formed through the hub portion to permit the insertion of the screws in assembling my wheel and for extracting the screws and disassembling, the aperture 13' being brought into alinement with the screw heads simply by rotating the hub portion until the head of the screw becomes visible through the aperture.

Figure 1:
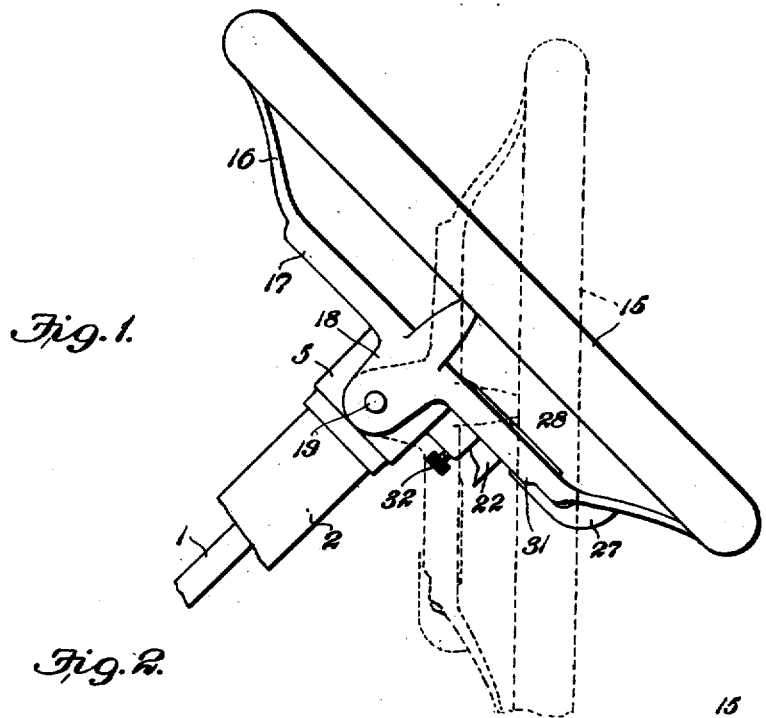
Figure 1 is a side elevation of a wheel constructed according to my invention with the operative position of the wheel shown in full lines and the dotted line position showing the location of the wheel when swung down to inoperative position.
Figure 4:
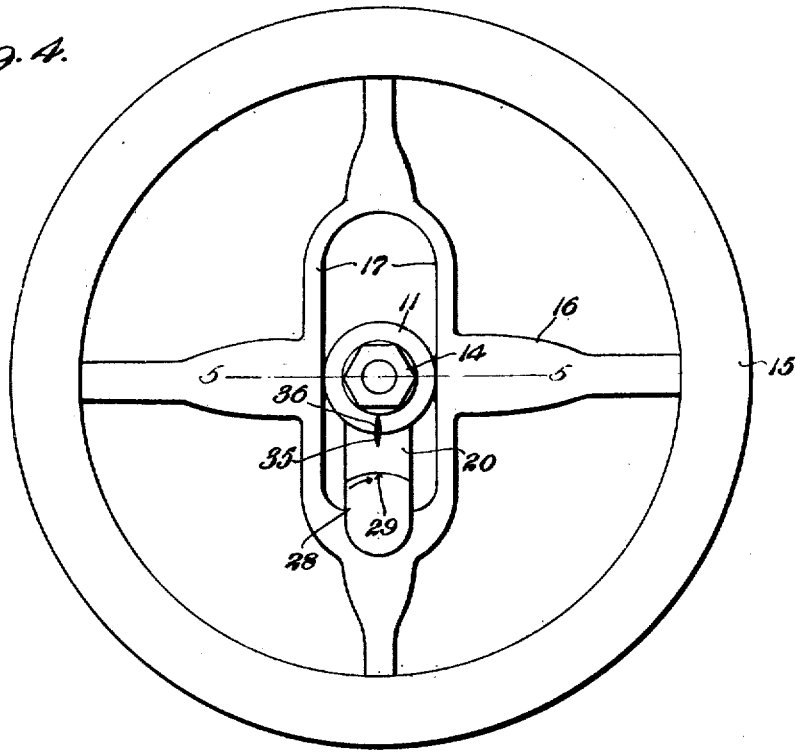
Fig. 4 is a plan view of my wheel.

The rim 15 of the wheel is carried upon a spider 16 which spider has a pair of parallel members 17 spaced apart the approximate distance of the outside diameter of the hub, which members join at either side of the hub as shown in Fig. 4, and depending from each of the members 17 is an ear 18. Apertures are formed through the ears 18 and the hub 5 in alinement with the slots 8 and through these apertures are inserted pins 19 secured by cotters inserted through suitable openings in their inner ends, the spider being thus mounted to pivot upon the pins 19 and to swing as shown by the dotted line position Fig. 1.

Equi-distantly spaced from the parallel members 17 and integral with the hub 5, is an extension 20, the extremity of which is spaced slightly inside the U-shaped portion formed by the joining of the members 17 at one end. An aperture 21 is formed horizontally through this extension and through this aperture is adapted to be inserted a latch bar member 22 on the inner end of which is formed a depression such as a cylindrical or rectangular hole designed to fit upon a pin 24 formed upon the portion 10 and similar in shape to the hole. When the latch bar 22 is inserted as just described it is obvious that the hub 5 will be locked to the portion 10 which portion it will be remembered is secured by the nuts 9 and 14 and the screws 13 to the steering post 1. It is obvious that the pin 24 and its corresponding opening in the latch bar can be of any one of a great variety of shapes and dimensions. In practice I will form the opening in the latch bar and its corresponding pin of a different shape or size upon every wheel manufactured, thus one latch bar may not be used upon a steering wheel for which it was not intended. In the outer extremity of the latch bar I secure a block of rubber belt or other similar material 25 which bears against the inner face of the U-shaped portion between the members 17 and prevents the latch bar from rattling when placed in position within the extension 20. Inserted through the spider 16 in alinement with the latch bar 22, is a pin 26 which is formed integral with a thumb lever 27 which is mounted beneath the said spider. The upper extremity of the pin 26 is threaded and upon this threaded end is screwed a plate 28 which lies upon the top face of the spider and extends inwardly above the latch bar 22 and into contact with the outer extremity of the extension 20. The inner edge of the plate 28 is curved on a radius struck from the center of the pin 26, and the contacting portion of the extension 20 is similarly curved as shown at 29 in Fig. 4. The upper end of the lever 27 is designed to fit within a slight notch or indentation 30 formed in the underside of the spider and a stop lug 31 formed integral with the said spider lies against one side of the said lever when it is positioned at its upper end within the notch 30, thus it is possible to swing the lever 27 and the plate 28 in one direction only, viz. the direction indicated by the arrow in Fig. 4. A thumb screw 32 threaded through the under part of the extension 20 fits within a notch 34 in the latch bar 22 when the same is in locked position and prevents the withdrawal of the said latch bar.

In operation my wheel will be as follows: We will assume that all of the parts are assembled as shown in Fig. 2. The hub 5 is now locked to the portion 10 which in turn is locked to the steering post, thus when the wheel is turned the steering post will be turned to steer the car. We will now assume that the driver desires to park his car and leave it unguarded for a space of time. To facilitate his exit from the car and from beneath the wheel he presses the right hand side of the lever 27 which swings the plate 28 in the direction indicated by the arrow in Fig. 4 thus allowing the spider and rim to pivot upon the pins 19 and swing down to the dotted line position shown in Fig. 1. This obviously gives more room between the steering post and the driver's seat. The driver now desiring to secure the car against theft, unscrews the thumb screw 32 sufficiently to withdraw its inner end from the notch 34 in the latch bar. The spider having been previously swung down to the position shown in dotted lines Fig. 1, the latch bar 22 can be withdrawn and carried away by the driver. The withdrawal of the latch bar now leaves the hub and wheel carried thereby free to rotate without moving the portion 10 and steering column and the pin 24 being of the peculiar shape of the opening in the end of the latch bar, no object save the latch bar designed to fit the particular wheel can be employed to lock the wheel in operative position again. The steering mechanism having been thus disabled it would be impossible to steal the car. When the owner returns and desires to once more lock the steering wheel into operative position, he rotates the rim 15 until the notch 35 formed in the extension on the hub is brought into alinement with the notch 36 formed in the portion 10, at which time the pin 24 is in proper register with the aperture 21 to receive the opening in the latch bar. The latch bar is now inserted and the lever 27 moved to swing the plate 28 back into position above the outer edge of the latch bar thus locking the wheel once more in operative position.

Having fully described my invention what I claim as new and desire to secure by Letters Patent, is—

1. In a steering wheel for motor vehicles and the like, a steering post, a hub rotatably mounted upon said steering post, a steering wheel pivoted to said hub and lever actuated mechanism for locking said wheel to said post.

2. In a steering wheel for motor vehicles and the like, a hub locked to rotate with the steering post of said vehicle, a spider pivotally mounted upon said hub, a rim secured to said spider and lever actuated mechanism for locking said spider against pivotal movement upon said hub.

3. In a steering wheel for motor vehicles and the like, a hub rotatably mounted upon the steering post of said wheel, means for locking said hub against rotation upon said steering post, a spider pivotally mounted upon said hub, a continuous rim secured to said spider, a pin rotatably mounted in said spider, a plate secured to said pin and an operating lever carried by said pin designed to swing the said plate in one direction to lock the spider and rim against pivotal movement upon the said hub, and in the opposite direction to unlock said spider to allow it to swing upon its pivots upon said hub.

4. In a steering wheel for motor vehicles and the like, a hub rotatably mounted upon the steering post of said wheel, a spider pivotally mounted upon said hub, a swinging latch pivoted through said spider, an aperture formed in the said hub, a removable latch bar fitting within said aperture and designed to lock said hub against rotation upon said steering post, the swinging latch being designed to be moved, when the latch bar is inserted to lock the hub and steering post together, to prevent pivotal movement of the spider on the said hub.

5. In a steering wheel for motor vehicles and the like, a hub rotatably mounted upon the steering post of the said wheel, a spider and a continuous rim mounted upon the said hub, an aperture formed through the said hub, a latch bar designed to exactly fit through the said aperture to lock the hub from rotation upon the steering post and means for securing the said latch bar to lock the hub against rotation.

In testimony that I claim the above, I have hereunto subscribed my name.

ORANGE B. FALES.

Copies of this patent may be obtained for five cents each, by addressing the "Commissioner of Patents, Washington, D. C."